UNITED STATES PATENT OFFICE 2,610,917

COLORING AGENT FOR PLASTIC MATERIALS

Bernard T. Hensgen, Chicago, Ill., assignor to Swift & Company, Chicago, Ill., a corporation of Illinois No Drawing. Application May 21, 1949, Serial No. 94,749

4 Claims. (Cl. 99—148)

This invention relates to the coloring of aqueous emulsions of edible plastic fatty materials. It has to do particularly with the coloring of margarine and similar materials, such as butter. More particularly, the invention is concerned with a special type of coloring agent which will color both the water and fat phases of the emulsion and which may be included in the container in direct contact with the margarine but will not cause coloring of the margarine until the package is worked.

It has been customary heretofore to color margarine with an oil-soluble dye. In order to prevent the dye from coloring the margarine, it has been necessary to maintain the dye apart from the margarine until it is desired to do the coloring. For example, the dye is often enclosed in a gelatin capsule which will protect the dye from the margarine until the capsule is broken.

In the patent to Adler et al., 2,454,420, there is disclosed a coloring unit comprising an aggregate mass containing an oil-soluble coloring material and an oil-insoluble coating enclosing the mass and all being dispersible in the margarine. It is intended that the coloring unit will not affect the color of the margarine even though the unit is in direct contact therewith until the coating is ruptured. The margarine and the coloring unit may be enclosed in a flexible container whereby the coating may be broken into minute particles by kneading the contents of the package to transfer the color to the margarine and to disperse the particles in the margarine or to secure absorption of the coating in the water phase. The present invention is an improvement over the invention of the Adler et al. patent.

An object of the present invention is to provide a margarine package containing the margarine and a coloring agent adapted for direct contact with the margarine, said coloring agent comprising oil-soluble and water-soluble dye components.

Another object of the invention is to provide a coloring unit for coloring margarine comprising an oil-soluble dye protected by an oil-insoluble, water-dispersible coating, said coating containing a water-soluble dye, the arrangement being such that the coloring agent, although in direct contact with the margarine, does not become dispersed in the margarine until the two are worked.

In the coloring of margarine with an oil-soluble dye as is customarily practiced, the coloring agent, such as a yellow dye, is dispersed in the fat phase of the margarine so that the dyed product simulates the appearance of butter. The dye, being fat soluble, has no coloring effect on the water phase of the margarine. Since approximately 20 per cent of the margarine is water, it will be observed that about ⅕ of the margarine remains uncolored. In order to secure the desired depth of color in the entire body of the margarine, it is necessary to increase the intensity of the color in the fat phase, and accordingly smoothness and uniformity of color are lacking in such a product as compared with one wherein both the water phase and the oil phase contain color material.

In accordance with the present invention, the oil-soluble coloring ingredient is included as an aggregate mass in the interior of the coloring unit and is covered with an oil-insoluble coating which contains a water-soluble coloring ingredient. The oil phase and the water phase are both colored when the coloring material is worked into the margarine, and the depth of color of both phases may be controlled by adjusting the ratio of the dye materials in the coating and in the center of the coloring unit. Such a coloring unit may be placed in direct contact with the margarine without affecting the color of either the oil phase or the water phase of the margarine until the margarine and coloring unit are worked. The oil-soluble coloring material is protected from coloring the fat phase of the margarine by the oil-insoluble coating. Since the margarine is a water-in-oil emulsion, the particles of the water are covered with a film of oil and the water-soluble coating is prevented from dispersing in the water phase by the film of oil surrounding the water particles. When the margarine and coloring unit are worked, however, the coating is broken to release the oil-soluble coloring material whereby the oil phase is colored, and the film of oil surrounding the particles of water is ruptured so that the water-soluble coloring material in the coating dissolves in and colors the water phase.

The oil-soluble coloring ingredient may be a conventional type such as used heretofore for coloring margarine, such as Yellow AB, also known as FD & C #3 (1-phenylazo-2-naphthylamine), and Yellow OB, also known as FD & C #4 (1-o-tolylazo-2-naphthylamine). Other oil-soluble dyes commonly used are annatto, carotene, and the like. These dyes are customarily used either in the solid form or as a solution in oil. It is preferable for the purpose of the present invention that the dye be used either in the powdered form or as a solution of the dye in an oil which has been thickened to a paste with an inert material, such as starch, flour, or similar materials. The thickness of the paste depends on the amount of thickener used. Ordinarily about 60 parts of inert material may be used to 40 parts of the dye and oil solution. A suitable oil may be prepared by using a vegetable oil hydrogenated to the proper consistency or a mixture of hydrogenated vegetable oil and salad oil.

The coating material may comprise a base material or a carrier medium to which is added the dye. The coating may vary considerably in composition. Suitable mixtures in the form of doughs or heavy bodied pastes are salt and sugar dispersed in glycerine; various starches, such as corn, potato, tapioca, and the like, or flour, such as wheat, soybean, and peanut dispersed in glycerine; and other finely divided or powdered edible inert materials mixed with glycerine. Instead of glycerine, propyl glycol or, in some cases, water may be used as a dispersing agent. When using glycerine as a dispersing agent, about 80 parts of inert material mixed with about 20 parts of glycerine will produce a suitable dough-like composition. Depending on the nature of the inert material, variations may be made to make sure that the coating material will have sufficient cohesiveness to prevent leakage of the oil-soluble material. The coating material should be sufficiently soft or sufficiently frangible so that it may be readily broken up and dispersed in the margarine.

If an oil-soluble dye were added to the coating, such coloring material would tend to be extracted by the fat and to color the margarine. Accordingly, water-soluble dyes or coloring materials are used. Dyes which have been found to be suitable when used alone or in mixture include FD & C Yellow #1 (disodium salt of 2-4-dinitro-1-naphthol-7-sulphonic acid); FD & C Yellow #2 (dipotassium salt of 2-4-dinitro-1-naphthol-7-sulphonic acid); FD & C Yellow #5, commonly known as "Tartrazine" (trisodium salt of 3-carboxy-5-hydroxy-1-p-sulfophenyl-4-p-sulfophenylazopyrazole); FD & C Yellow #6, commonly known as "Sunset Yellow FCF" (disodium salt of 1-p-sulfophenylazo-2-naphthol-6-sulphonic acid); annatto, a commercial water-soluble preparation such as used in the coloring of cheese; saffron in water-soluble form; safflower in water-soluble form; and turmeric in water-soluble form.

The oil-soluble component of the coloring unit may be compounded, for example, from the following ingredients in the proportions indicated:

| | Per cent |
|---|---|
| Yellow Dye FD & C #3 | 4.7 |
| Yellow Dye FD & C #4 | 3.1 |
| Hydrogenated vegetable oil (melting point 102° F.) | 15.0 |
| Salad oil | 14.0 |
| Wheat flour | 62.0 |
| Sodium bicarbonate | 1.2 |

The hydrogenated vegetable oil is preferably melted to a liquid and the salad oil mixed therewith. The two dyes may be dissolved in the oil mixture at a temperature of approximately 150° F. The wheat flour and sodium bicarbonate are then mixed with the oil solution at a temperature sufficiently high to maintain the solution in a liquid state until the mixture becomes of paste-like consistency.

The water-dispersible coating material, for example, may be formed of the following ingredients in the proportions mentioned:

| | Per cent |
|---|---|
| Powdered salt | 40 |
| Powdered sugar | 32 |
| Corn starch | 9 |
| Glycerine | 18.83 |
| Dye | 0.17 |

The dye, salt, sugar, and corn starch are added to the glycerine, and the product is thoroughly mixed until a heavy paste-like dough is formed.

An alternative coating composition may be made by mixing the following ingredients in the porportions indicated:

| | Grams |
|---|---|
| Powdered salt | 23 |
| Powdered sugar | 47 |
| Tapioca flour | 10 |
| Powdered carboxymethyl cellulose | 2 |
| Glyerine | 17.8 |
| Dye | 0.2 |

The coloring agent may be formed into a pellet, pill, or tablet comprising a center of the oil-solube ingredient covered with a coating of the water-soluble or water-dispersible material. Suitable machines are available for forming pellets or pills of this character, and any well-known or preferred type of such mechanical devices may be used.

A convenient method of preparing the pellets is to prepare a sheet of the coating material and form indentations or pockets therein. The oil-soluble paste is then deposited in the proper amount in the indentations. A second sheet of the coating material is then placed over the sheet containing the filled indentations, and the two sheets are joined together by pressing. Individual pellets may then be stamped out of the sheets.

A suitable pellet may be prepared, for example, by forming 0.2 gram of the oil-soluble coloring material described above into an aggregate mass and then coating the mass with 1.8 grams of a coating composition such as described in either one of the examples described above. An individual pellet of approximately 2 grams in weight is suitable for coloring a one-pound print of margarine. It is intended that about 20 per cent of the total active color ingredients be included in the water-dispersible coating and about 80 per cent in the oil-soluble center of the pellet, although these proportions may be varied considerably.

The pellet may be placed in direct contact with the print of margarine by laying it on the surface of the margarine or by embedding it in the interior of the block of margarine. It is preferable to place the coloring on the side of the margarine or at a point approximately midway between the ends as such a location facilitates the distribution of the coloring material throughout the body of the margarine.

The print of margarine and the coloring material may be packaged in the regular manner of packaging margarine. For example, the print of margarine and the dye material may be wrapped in a translucent parchment type of paper and the wrapped print enclosed in a waxed paper carton. When it is desired to color the margarine, it may be removed from the carton, the print separated from the wrapper, and the margarine colored by working the margarine and the coloring material in a bowl until the coloring material is distributed uniformly throughout the body of margarine.

The margarine prepared in accordance with the present invention is particularly adaptable for packaging in a heat-sealed, flexible bag. The margarine and the coloring material may be enclosed in the flexible bag by any suitable means either by forming the bag about a print of margarine or by filling the margarine into a preformed bag which is then heat sealed. With such a type of bag, the coloring material may be readily distributed in the margarine by kneading the bag. The bag and contents may, of course, be packaged in a waxed paper carton.

The sales unit of margarine packaged in either of the methods described above may be distributed in the usual channels to the consumer as uncolored margarine. The margarine may be colored by the consumer merely by working the mass of margarine containing the coloring unit.

The use of the two dyes permits coloring of both phases of the margarine mass. An important advantage of the complete coloring of both phases is apparent when the margarine is melted for use as a seasoning on vegetables or as a medium for frying eggs or other uses in which it is necessary to melt the product. Ordinarily, margarine colored in the oil phase only will exhibit a white curd dispersed in a yellow oil since the water phase, of which the curd is a part, has not been colored. Conversely, a margarine colored only in the water phase will show yellow particles of curd dispersed through a colorless oil. When the product is colored with a combination as set forth above, both phases of the mass are colored and the objectionable color difference is eliminated.

The color of the margarine when colored with a dye material including a water-soluble dye is more attractive than when the margarine is colored with a conventional oil-soluble dye only. This increase in attractiveness appears to be due to the color being dispersed in both the water phase and the oil phase of the margarine. This seems to diminish the brilliance of the color which is characteristic of margarine colored in the oil phase only thereby causing the colored product to appear less shiny and less greasy.

Obviously, many modifications and variations of the invention as hereinbefore set forth may be made without departing from the spirit and scope thereof, and therefore only such limitations should be imposed as are indicated in the appended claims.

I claim:
1. A coloring unit for coloring aqueous emulsions of plastic fatty food products, said unit being adapted to color both the water and fat phases of the emulsion, comprising: a body of coloring reagent which is substantially soluble in said fat phase and a water dispersible coating containing a water-soluble coloring reagent which is substantially soluble in said water phase and is substantially insoluble in said fat phase, said coating enclosing said body as a unit and all being dispersible in said emulsion.

2. A margarine coloring unit adapted to be worked into the margarine to impart color thereto, comprising: a mass of oil-soluble coloring material enclosed within a water dispersible container containing a water-soluble, oil-insoluble coloring material, said unit being frangible and dispersible in the margarine on working to color both the water and fat components of the margarine.

3. A margarine coloring unit adapted to be placed in direct contact with the margarine in a package and adapted to be worked into the margarine to impart color thereto, which comprises: a mass containing oil-soluble coloring material enclosed within a coating containing water-soluble coloring material, said unit being dispersible in the margarine and the ratio of oil-soluble and water-soluble coloring material in said unit being such as to color substantially the oil and water phases of the margarine.

4. In a margarine package including a sales size body of margarine suitable for enclosure in a container for marketing, a coloring unit adapted to be placed in direct contact with the margarine without imparting color thereto, said unit comprising a mass of oil-soluble coloring material dispersible in the fat phase of the margarine and a water dispersible coating for said mass of oil-soluble coloring material, said coating containing a water-soluble coloring reagent.

BERNARD T. HENSGEN.

REFERENCES CITED

The following references are of record in the file of this patent:

UNITED STATES PATENTS

| Number | Name | Date |
| --- | --- | --- |
| 1,919,025 | Jones et al. | July 18, 1933 |
| 2,454,420 | Adler et al. | Nov. 23, 1948 |